United States Patent [19]

Emura et al.

[11] Patent Number: 4,762,290

[45] Date of Patent: Aug. 9, 1988

[54] FISHLINE HOLDER FOR A FISHING REEL

[75] Inventors: Masaharu Emura; Takehiro Kobayashi, both of Hiroshima, Japan

[73] Assignee: Ryobi, Ltd., Hiroshima, Japan

[21] Appl. No.: 74,709

[22] Filed: Jul. 17, 1987

[30] Foreign Application Priority Data

Jul. 18, 1986 [JP] Japan .................... 61-110766[U]

[51] Int. Cl.⁴ .............................................. A01K 89/00
[52] U.S. Cl. .................................. 242/84.1 K; 24/127; 242/84.1 R
[58] Field of Search ............... 242/84.1 K, 84.1 J, 242/84.1 R; 24/94, 104, 108, 297, 127

[56] References Cited

U.S. PATENT DOCUMENTS

| | | | |
|---|---|---|---|
| 484,661 | 10/1892 | King | 24/127 |
| 2,191,780 | 2/1940 | Tinnerman | 24/297 X |
| 3,164,334 | 1/1965 | Gris | 242/84.1 K |
| 3,771,741 | 11/1983 | Stein | 242/84.1 K X |

FOREIGN PATENT DOCUMENTS 302860 12/1928 United Kingdom ........... 242/84.1 J

*Primary Examiner*—Stuart S. Levy
*Assistant Examiner*—Katherine Matecki
*Attorney, Agent, or Firm*—Finnegan, Henderson, Farabow, Garrett & Dunner

[57] ABSTRACT

In the fishline holder, the holding member support portion has a through hole with a first diameter portion continuous to a larger second diameter portion or recess. The stem of the fishline holding member is slideably positioned in the through hole. A groove is provided at the lower end of the stem of the holding member. The fishline holding spring is engaged in the groove of the stem and the ends of the spring are supported on the inside surface of the outer wall of the body of the fishing reel or the inside surface of the holding member support. Since the holding spring engaged in the groove serves not only to hold the holding member from coming off, an exclusive component part for preventing the holding member from coming off does not need to be provided. Also, the fishline holder can be easily assembled and the cost of manufacturing is reduced.

5 Claims, 4 Drawing Sheets

4,762,290

FISHLINE HOLDER FOR A FISHING REEL

FIELD OF THE INVENTION

The present invention relates to a fishline holder appropriate to prevent fishline from unwinding from the spool of a fishing reel and tangling at the time of winding, putting-away or carrying of the reel.

BACKGROUND OF THE INVENTION

In a conventional fishline holder, an attaching hole is provided in the lid plate of a fishing reel; a fishline holding member having a head is slidably fitted in the attaching hole; an E-ring is secured to the projecting end of the fishline holding member; a washer is fitted on the E-ring; and a helical spring is provided on the fishline holding member in such a manner that the ends of the spring are supported on the washer and the inside surface of the lid plate.

In another conventional fishline holder, a speed nut is secured to the projecting end of a fishline holding member; and a spring washer is fitted on the speed nut.

As for the constitution of the above conventional fishline holders, there are problems in that the number of the component parts of such holders is large, because the E-ring and the speed nut are exclusive component parts to prevent the fishline holding members from coming off. Also, it is not necessarily easy to assemble each of the fishline holders.

SUMMARY OF THE INVENTION

The present invention was made in order to solve the abovementioned problems.

Accordingly, it is an object of the present invention to provide a fishline holder wherein the number of component parts is reduced to facilitate the assembly of the fishline holder and diminish the cost thereof.

In accordance with the present invention there is provided a fishline holder for a fishing reel comprising a fishline holding member inserted in a through hole provided in a fishline holding member support and continuous at the lower end of the hole to a recess. A groove is provided at the lower end of the fishline holding member. The central portion of a fishline holding spring is engaged in the groove. The ends of the fishline holding spring are supported on the fishline holding member, the inside surface of the outer wall of the fishing reel or the like. As a result, the fishline holding spring not only holds a fishline, but it also prevents the fishline holding member from coming off.

The lower end of the through hole is continuous to the recess, whose diameter is larger than that of the through hole. The through hole is provided in the holding member provided in an appropriate position integrally with or separately from the outer wall of the body of the fishing reel. The holding member having a large-diameter head on the top of a stem is inserted in the through hole so that the holding member can be slid up and down. A fishline holding section is constituted by the large-diameter head of the member and the holding member support. The groove is provided in the stem of the holding member at the bottom of the stem so that the groove extends along the circumstance of the stem. The central portion of the fishline holding spring is engaged in the groove. The ends of the spring are supported on the inside surface of the outer wall of the body of the fishing reel, the inside surface of the holding member support or the like.

Since the holding spring engaged in the groove serves not only to hold the fishline but also to prevent the holding member from coming off, an exclusive component part for preventing the holding member from coming off does not need to be provided. This reduces the number of the component parts required for the fishline holder. Since the holding spring is engaged in the groove after insertion of the stem of the holding member into the through hole of the holding member support, and the large-diameter recess is provided continuously to the lower end of the through hole to secure a deflection allowance for the fishline holding spring, the spring can be attached in the holder without an initial deflection required. For these reasons, the fishline holder can be easily assembled, and the cost of manufacturing thereof is diminished.

Since the stem of the holding member and the holding spring do not project inward from the holding member support, the outer wall of the body of the fishing reel or the like, the installation space required for the fishline holder can be reduced. Therefore, the installed position of the fishline holder is not limited, so that the holder can be provided in the most easily usable position on the body of the fishing reel.

Since the large-diameter recess is provided, the holding member can be provided with a sufficient spring-operability even though the axial dimension of the member is shortened. For that reason, fishlines of both large and small diameters can be optionally held by the fishline holder.

DETAILED DESCRIPTION OF EXEMPLARY EMBODIMENTS

Figure 1:
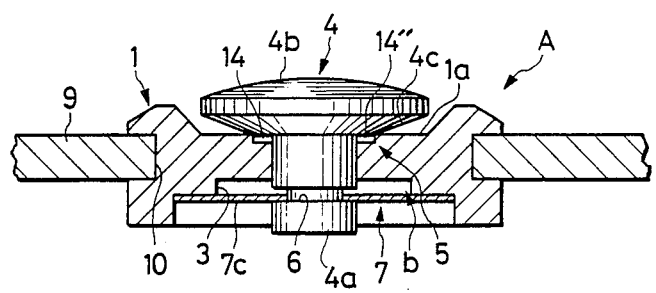
FIG. 1 shows a longitudinal sectional view of a preferred embodiment of the present invention, which is a fishline holder for a fishing reel.
Figure 2:
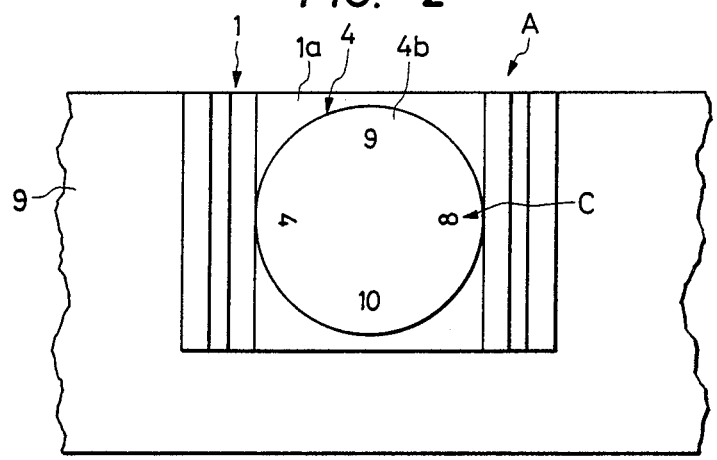
FIG. 2 shows a plan view of the embodiment.
Figure 3:
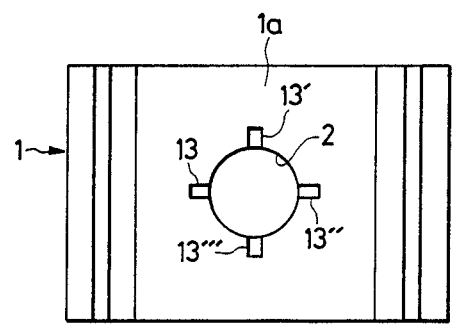
FIG. 3 shows a plan view of the fishline holding member support of the embodiment.

Embodiments of the present invention are hereafter described in detail with reference to the drawings attached hereto.

In each of the embodiments, a circular through-holes 2 is provided in the center of a fishline holding member support 1, and a large-diameter recess 3 whose diameter is much larger than that of the hole 2 is provided at the lower end of the hole, as shown in FIGS. 1, 2, 3, 4, 5, 6 and 7.

The cylindrical stem 4a of a fishline holding member 4 having a large-diameter head 4b on the top of the stem is inserted in the through-hole 2 so that a fishline holding section 5 is constituted by the top 1a of the holding member support 1 and the bottom 4c of the large-diameter head 4b.

Figure 8:
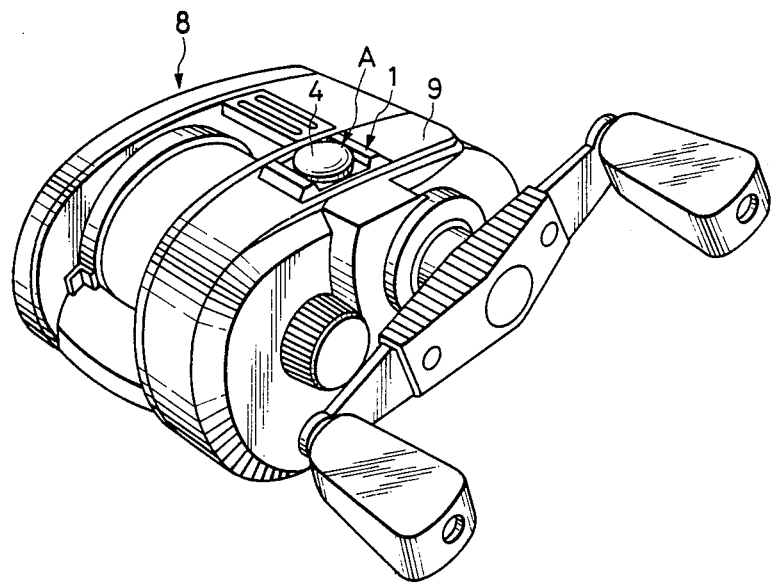
FIGS. 8 and 9 show perspective views of fishing reels provided with fishline holders in accordance with the present invention, respectively.
Figure 9:
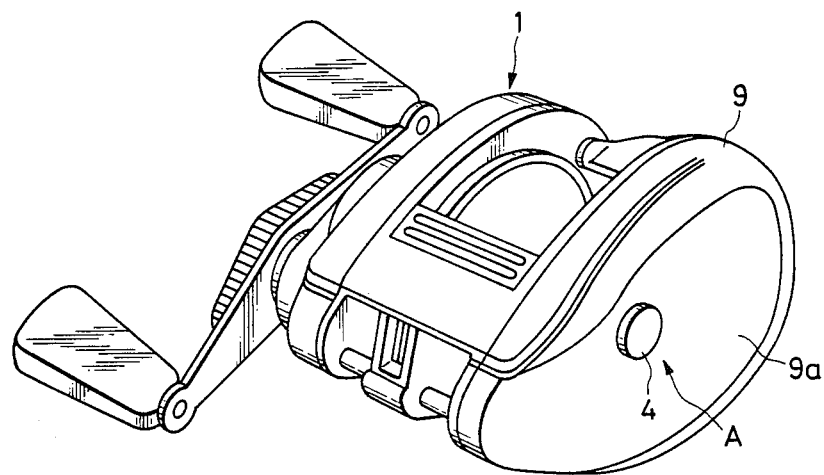

A spring engaging groove 6 is provided at the lower end of stem 4a of the holding member 4 so that the groove extends along the circumference of the stem. The middle portion of a holding spring 7 is engaged in the groove 6 so that the spring serves not only to hold a fishline (a) at the fishline holding section 5 but also to prevent the holding member 4 from coming off. Both the ends of the holding spring 7 are supported on the inside surface of the holding member support 1, the inside surface of the outer wall of the body of the fishing reel as shown in FIGS. 8 and 9, respectively, or the like. A holding spring deflection allowance (b), which corresponds to the diameter and depth of the large-diameter recess 3, is provided by the recess 3 over the center portion of the holding spring 7 so that the holding member 4 is vertically moveable against the spring 7.

The bottom 4c of the large-diameter head of the holding member 4 opposite the fishline holding section 5 is tapered so that the fishline (a) can be easily engaged in and disengaged out between the bottom 4c of the member 4 and the top 1a of the holding member support 1.

Figure 5:
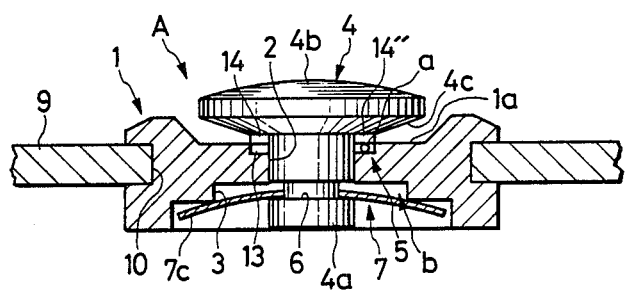
FIG. 5 shows a longitudinal sectional view of the embodiment in the fishline holding state.
Figure 7:
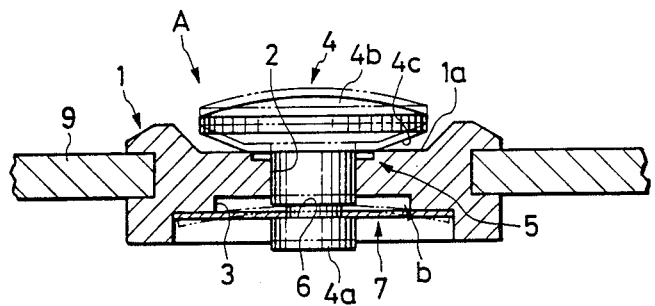

In the embodiments shown in FIGS. 1, 5 and 7, the holding member 1 is manufactured separately from the body 8 of the fishing reel and fixedly fitted in the attaching hole 10 of the outer wall 9 of the reel body 8.

Figure 6:
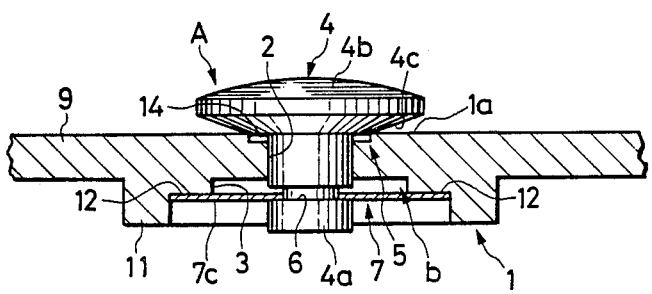
FIGS. 6 and 7 show longitudinal sectional views of other embodiments of the present invention.

In the embodiment shown in FIG. 6, the through hole 2 and the large-diameter recess 3 are provided in the outer wall 9 of the reel body 8 and communicate with each other. The holding member support 1 is integrated with the outer wall 9 so that projections 11 are provided on the inside surface of the outer wall at the right and left of the recess 3 and have spring engaging steps 12.

The top 1a of the holding member support 1 and the bottom 4c of the large-diameter head 4b of the holding member 4 are provided with a desired number (four in the embodiments shown in the drawings) of positioning recesses 13, 13', 13'' and 13''' and positioning projections 14, 14', 14'' and 14''', which are opposed to each other so that they can be engaged with and disengaged from each other to restrict the rotation of the holding member 4. A fishline holder in which no stopper of the rotation of the support member is provided as shown in FIG. 7. Numerals (c) such as 4, 6, 8 and 10, which denote the thicknesses of fishlines (a), are indicated on the surface of the large-diameter head 4b of the holding member 4 so that the fishline (a) currently wound on the spool of the fishing reel is held by the fishline holding section 5 at the numeral (c) corresponding to the thickness of the fishline. For that reason, the thickness of the fishline (a) currently wound on the spool of the fishing reel can be easily remembered when the fishline is used next time. For that purpose, the appropriate fishline (a) is engaged in between the corresponding pair of positioning recess and positioning projection.

Figure 4A:
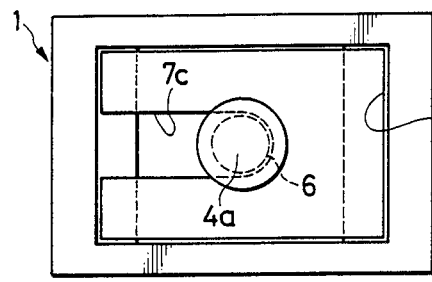
FIGS. 4A and 4B show a bottom view of the fishline holding member support, respectively.
Figure 4B:
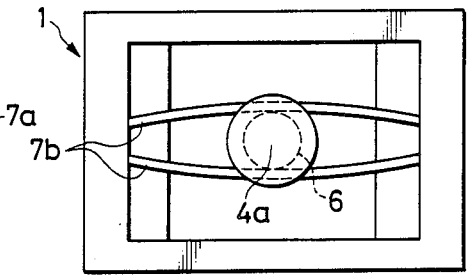

The holding spring 7 is made of a plate spring 7a as shown in FIG. 4A, two wire springs 7b as shown in FIG. 4B, or the like.

When the spring 7 is made of the plate spring 7a, a U-shaped notch 7c is provided, whose width is equal to or slightly larger than the diameter of the bottom of the groove 6, and extends from the central portion thereof to one side edge thereof. The spring 7a is slid sideward as the open end of the notch 7c is located ahead, so that the spring is engaged in the groove 6.

When the spring 7 is made of the two wire springs 7b, the wire springs are supported on the inside surface of the holding member support 1 or the like so that both the ends of the wire springs do not spread outward and the central portions of the springs are engaged in the groove 6.

FIG. 8 shows a fishline holder A provided in the outer wall 9 of the side frame of a fishing reel body 8 in accordance with the present invention.

FIG. 9 shows a fishline holder A provided in the lid plate 9a of the side frame of a fishing reel body 8 in accordance with the present invention.

Figure 10:
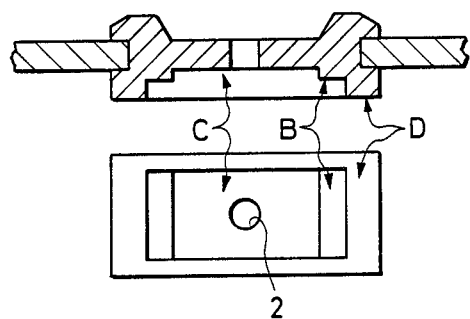
FIG. 10 shows the relationship between a longitudinal section view and a bottom view of an embodiment of the present invention.

FIG. 10 shows the relationship between a longitudinal sectional view and a bottom view of an embodiment of the invention, in which the support member is provided with a through-hole 2 in the center thereof, a spring support portion B which is higher in depth than a bottom portion C for supporting a spring, and further a wall B is provided for preventing the spring from being disengaged.

Having described preferred embodiments of the present invention, it recognized that modification used variations thereof, falling within the scope of the appended claims, will become apparent to one skilled in the art.

What is claimed is:

1. A fishline holder for a fishing reel comprising:
a body including a support portion, said support portion having a through hole with a first diameter portion and a second enlarged diameter portion to form a first recess of predetermined depth having a first shoulder at the juncture of said first and second diameter portion and a second shoulder surrounding the second enlarged diameter portion, said support portion having a top provided with a plurality of positioning recesses;
a fishline holding member having a head portion and a stem portion slidably positioned in said through hole, said head portion being demensioned for restricting movement of the holding member in a first axial direction at times when said head portion is at rest in a first position in engagement with the support portion surrounding the through hole, said stem portion having a circumferentially extending groove of predetermined width substantially equal to the predetermined depth of the first recess, said groove being axially spaced from the head portion to substantially conincide with said first recess, said head portion having a bottom provided with a plurality of positioning projections adapted to engage and disengage said positioning recesses to restrict the rotation of said holding member;
spring means diposed in said groove and physically engaging said second shoulder for urging the holding member in said first axial direction to maintain said head in said first position, said spring means being configured to deflect and thereby engage said first shoulder at times when said member is pulled in a second axial direction opposite the first for limiting the movement of the holding member.

2. A fishline holder according to claim 1, wherein the spring means includes an annular plate having a U-shaped opening for receiving the stem of the holding member so dimensioned to be retained in the groove of the stem.

3. A fishline holder according to claim 1 wherein the spring means includes a pair of spaced elongated resilient members having outer ends supported by the second shoulder and a central portion disposed in the groove.

4. A fishline holder according to claim 1 wherein the head portion of the holding member has a tapered surface portion opposite the support portion surrounding the through hole to facilitate manipulation of the holding member.

5. A fishline holder according to claim 1, wherein said support portion is integral with the body.

* * * * *